(12) United States Patent
Takahashi

(10) Patent No.: US 12,224,415 B2
(45) Date of Patent: Feb. 11, 2025

(54) POWER SUPPLY DEVICE, ELECTRIC VEHICLE USING SAME, AND POWER STORAGE DEVICE

(71) Applicant: SANYO Electric Co., Ltd., Osaka (JP)

(72) Inventor: Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 398 days.

(21) Appl. No.: 17/630,947

(22) PCT Filed: Jul. 20, 2020

(86) PCT No.: PCT/JP2020/028024
§ 371 (c)(1),
(2) Date: Jan. 28, 2022

(87) PCT Pub. No.: WO2021/024772
PCT Pub. Date: Feb. 11, 2021

(65) Prior Publication Data
US 2022/0278384 A1 Sep. 1, 2022

(30) Foreign Application Priority Data
Aug. 7, 2019 (JP) .................. 2019-145726

(51) Int. Cl.
*H01M 10/613* (2014.01)
*B60K 6/28* (2007.10)
(Continued)

(52) U.S. Cl.
CPC ............ *H01M 10/613* (2015.04); *B60K 6/28* (2013.01); *B60L 50/64* (2019.02);
(Continued)

(58) Field of Classification Search
CPC ........... H01M 10/613; H01M 10/0481; H01M 10/625; H01M 10/647; H01M 10/653;
(Continued)

(56) References Cited

U.S. PATENT DOCUMENTS

| 2012/0141855 A1 | 6/2012 | Okada et al. |
| 2013/0337310 A1 | 12/2013 | Omura et al. |
| 2016/0329617 A1 | 11/2016 | Omura et al. |

FOREIGN PATENT DOCUMENTS

| JP | 2012-181972 | 9/2012 |
| JP | 2015-084331 | 4/2015 |

(Continued)

OTHER PUBLICATIONS

English Translation of Chinese Search Report dated Nov. 22, 2023, issued in counterpart CN Patent Application No. 202080055108.4. (3 pages).

(Continued)

*Primary Examiner* — Sarah A. Slifka
(74) *Attorney, Agent, or Firm* — WHDA, LLP

(57) ABSTRACT

Power supply device includes a plurality of battery cells each having an exterior can in a prismatic shape, a pair of end plates having pressing surfaces that press both side end surfaces of battery stack in which the plurality of battery cells are stacked, a plurality of fastening members each of which has a plate shape extended in a stacking direction of the plurality of battery cells and is disposed on opposing side surfaces of battery stack to fasten end plates to each other, thermal plate for placing battery stack on an upper surface side to dissipate heat from battery stack, and heat transfer sheet interposed between an upper surface of thermal plate and a lower surface of battery stack to bring thermal plate and battery stack into a thermally coupled state. A part of a lower surface of each of end plates, the part facing heat transfer sheet, is disposed at the same height as or above an upper surface of heat transfer sheet.

21 Claims, 14 Drawing Sheets

(51) Int. Cl.
*B60L 50/64* (2019.01)
*H01M 10/04* (2006.01)
*H01M 10/42* (2006.01)
*H01M 10/44* (2006.01)
*H01M 10/625* (2014.01)
*H01M 10/647* (2014.01)
*H01M 10/653* (2014.01)
*H01M 10/6551* (2014.01)
*H01M 10/6554* (2014.01)
*H01M 10/6556* (2014.01)
*H01M 10/6569* (2014.01)
*H02J 7/00* (2006.01)
*H02J 7/35* (2006.01)
*H02P 27/06* (2006.01)

(52) U.S. Cl.
CPC ... *H01M 10/0481* (2013.01); *H01M 10/4257* (2013.01); *H01M 10/441* (2013.01); *H01M 10/625* (2015.04); *H01M 10/647* (2015.04); *H01M 10/653* (2015.04); *H01M 10/6551* (2015.04); *H01M 10/6554* (2015.04); *H01M 10/6556* (2015.04); *H01M 10/6569* (2015.04); *B60Y 2200/91* (2013.01); *B60Y 2200/92* (2013.01); *B60Y 2400/112* (2013.01); *H01M 2010/4271* (2013.01); *H01M 2220/20* (2013.01); *H02J 7/0013* (2013.01); *H02J 7/35* (2013.01); *H02P 27/06* (2013.01)

(58) Field of Classification Search
CPC ......... H01M 10/6551; H01M 10/6554; H01M 10/6556; H01M 10/6569
See application file for complete search history.

(56) References Cited

FOREIGN PATENT DOCUMENTS

| | | |
|---|---|---|
| WO | 2012/117681 | 9/2012 |
| WO | 2013/084756 A1 | 6/2013 |
| WO | 2013/146561 A1 | 10/2013 |
| WO | 2017/064969 A1 | 4/2017 |

OTHER PUBLICATIONS

The Extended European Search Report dated Sep. 19, 2022 for the related European Patent Application No. 20850251.8.
International Search Report of PCT application No. PCT/JP2020/028024 dated Aug. 25, 2020.

POWER SUPPLY DEVICE, ELECTRIC VEHICLE USING SAME, AND POWER STORAGE DEVICE

CROSS-REFERENCE TO RELATED APPLICATIONS

This application is a U.S. national stage application of the PCT International Application No. PCT/JP2020/028024 filed on Jul. 20, 2020, which claims the benefit of foreign priority of Japanese patent application No. 2019-145726 filed on Aug. 7, 2019, the contents all of which are incorporated herein by reference.

TECHNICAL FIELD

The present invention relates to a power supply device, and an electric vehicle and power storage device using the same.

BACKGROUND ART

A power supply device is used as a power supply device for driving an electric vehicle, a power supply device for power storage, and the like. In such a power supply device, a plurality of chargeable and dischargeable battery cells are stacked. Furthermore, in the battery cells, it is known that an outer covering can is expanded by charging and discharging. Therefore, a battery stack in which the plurality of battery cells are stacked is fastened and held in a compressed state. In general, as illustrated in a perspective view of FIG. 14, in power supply device 900, end plates 903 are disposed on both end surfaces of a battery stack in which battery cells 901 of prismatic outer covering cans and insulating spacers 902 are alternately stacked, and end plates 903 are fastened to each other by bind bars 904 made of metal.

Furthermore, in such a power supply device, since the battery stack generates heat by charging and discharging, a heat dissipation mechanism is provided. As the heat dissipation mechanism, it is conceivable to provide a thermal plate with a heat transfer sheet interposed on a lower surface of the battery stack.

On the other hand, with the recent demand for higher capacity, the number of stacked battery cells constituting the battery stack tends to increase. In such a configuration, in order to place the battery stack on the heat transfer sheet in a thermally coupled state, a large number of battery cells are compressed in a stacked state. However, when the number of the stacked battery cells increases, a change in the overall length of the battery stack increases before and after compression when the battery stack is compressed at the time of fastening by a fastening member such as a bind bar. As a result, as illustrated in FIG. 15, at a stage of first stacking the battery cells, in particular, the battery cells located at end parts may not be placed on heat transfer sheet 550. In order to prevent this, it is conceivable to use a long heat transfer sheet, but in this case, as illustrated in FIG. 16, when battery stack 610 in which battery cells 601 are stacked is fastened and compressed, end plate 620 interferes with heat transfer sheet 640, wrinkles are generated in heat transfer sheet 640, and an adverse effect is generated on a thermally coupled state.

CITATION LIST

Patent Literature

PTL 1: Unexamined Japanese Patent Publication No. 2015-84331

SUMMARY OF THE INVENTION

An object of the present invention is to provide a power supply device that ensures heat dissipation by being appropriately thermally coupled with a heat transfer sheet even when the number of stacked battery cells increases, and an electric vehicle and a power storage device using the power supply device.

A power supply device according to one aspect of the present invention is a power supply device including: a plurality of battery cells each including an outer covering can in a prismatic shape; a pair of end plates including pressing surfaces that press both side end surfaces of a battery stack in which the plurality of battery cells are stacked; a plurality of fastening members each forming a plate shape extended in a stacking direction of the plurality of battery cells, and disposed on opposing side surfaces of the battery stack to fasten the end plates to each other; a thermal plate for placing the battery stack on an upper surface side and dissipating heat from the battery stack; and a heat transfer sheet interposed between an upper surface of the thermal plate and a lower surface of the battery stack to bring the thermal plate and the battery stack into a thermally coupled state, in which a part of a lower surface of each of the end plates, the part facing the heat transfer sheet, is disposed at the same height as or above an upper surface of the heat transfer sheet.

According to the power supply device described above, when the battery stack is fastened by the fastening members, the work of compressing both end surfaces of the battery stack by the pressing surfaces of the end plates can be prevented from being obstructed by the heat transfer sheet because the pressing surfaces are disposed above the heat transfer sheet.

DESCRIPTION OF EMBODIMENT

Figure 1:
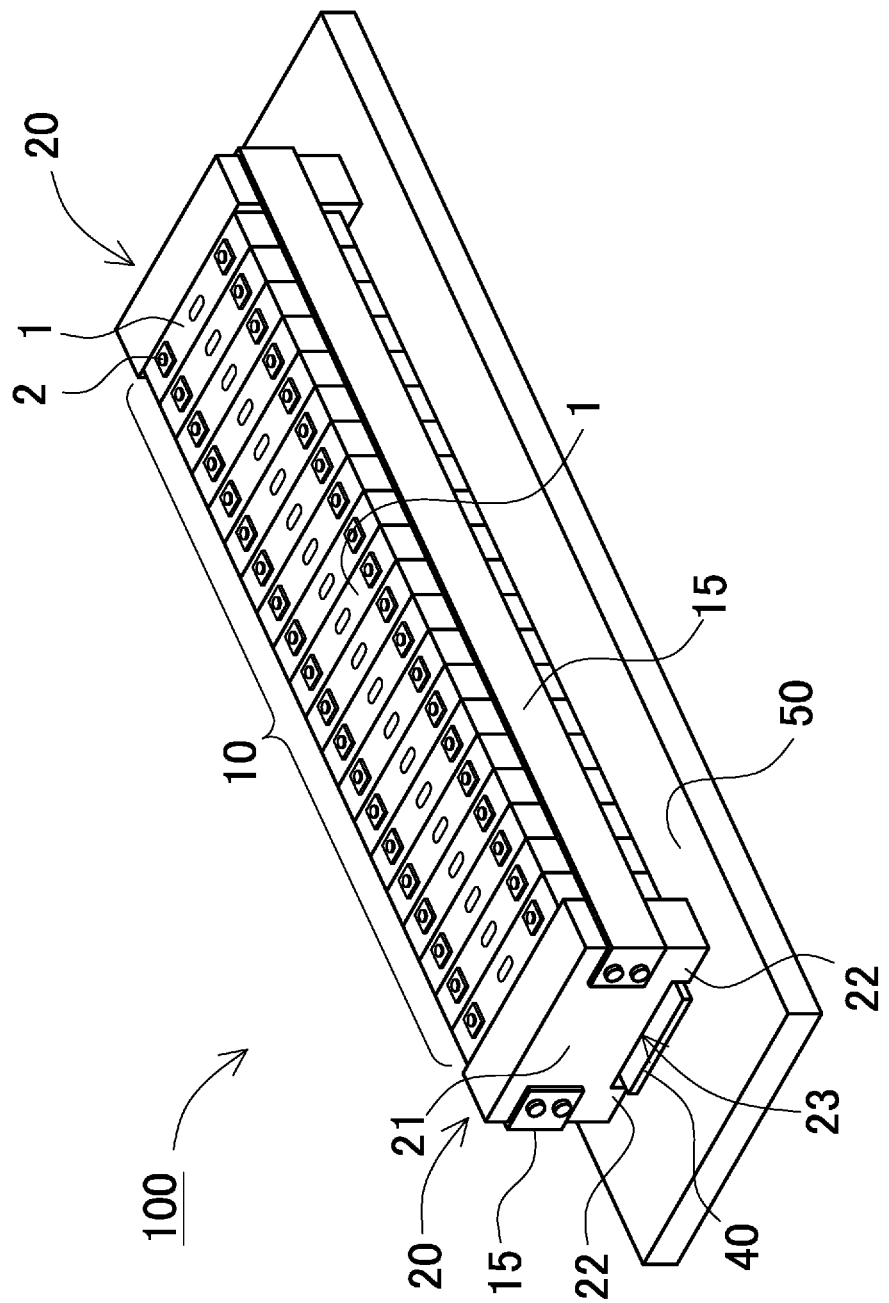
FIG. 1 is a perspective view illustrating a power supply device according to a first exemplary embodiment.

Exemplary embodiments of the present invention may be specified by the following configurations.

In a power supply device according to an exemplary embodiment of the present invention, each of the end plates is formed with spacer parts protruding by a thickness of the heat transfer sheet on both sides of each of the pressing surfaces, respectively. With the above configuration, the pressing surfaces can be floated by the thickness of the heat transfer sheet by the spacer parts and disposed on the heat dissipation sheet.

In a power supply device according to another exemplary embodiment of the present invention, each of the end plates integrally forms each of the pressing surfaces and the spacer parts.

In a power supply device according to another exemplary embodiment of the present invention, a recessed part is formed on a lower surface of each of the end plates by each of the pressing surfaces and the spacer parts. Furthermore, a gap is formed between the recessed part and the heat transfer sheet. With the above configuration, even if a position of each of the end plates is displaced due to expansion or contraction of the battery stack, it is possible to avoid a situation in which interference or a load is applied to the heat transfer sheet due to the displacement of the end plates.

Further, in a power supply device according to another exemplary embodiment of the present invention, a lower surface of each of the end plates is separated from an end surface of the heat transfer sheet.

Furthermore, a power supply device according to another exemplary embodiment of the present invention further includes an intermediate plate that is located in a middle of the battery stack and presses the battery stack from the middle on both side surfaces.

Furthermore, in a power supply device according to another exemplary embodiment of the present invention, the thermal plate is divided at a position of the intermediate plate.

Furthermore, in a power supply device according to another exemplary embodiment of the present invention, a low frictional resistance region that reduces frictional resistance with the battery stack is provided on an upper surface of the heat transfer sheet.

Furthermore, in a power supply device according to another exemplary embodiment of the present invention, the low frictional resistance region is a sliding sheet interposed between the heat transfer sheet and the battery stack, and frictional resistance of the sliding sheet is lower than that of the heat transfer sheet. With the above configuration, even if the battery cells constituting the battery stack expand or contract on the upper surface of the heat transfer sheet, it is possible to avoid the surface of the heat transfer sheet from being wrinkled by interposing the sliding sheet having a small frictional resistance, and to maintain the thermally coupled state between the battery stack and the heat transfer sheet.

Furthermore, in a power supply device according to another exemplary embodiment of the present invention, the heat transfer sheet is made of an insulating member with elasticity.

Furthermore, in a power supply device according to another exemplary embodiment of the present invention, the thermal plate includes a refrigerant circulation path inside. According to the above configuration, the battery stack can be efficiently dissipated and cooled by the cooling medium, and the thermally coupled state between the battery stack and the thermal plate can be suitably maintained by the heat transfer sheet.

Furthermore, a vehicle according to another exemplary embodiment of the present invention includes any one of the power supply devices described above. The vehicle includes the power supply device, a travelling motor that is supplied with electric power from the power supply device, a vehicle body on which the power supply device and the motor are mounted, and wheels that are driven by the motor to cause the vehicle body to travel.

Furthermore, a power storage device according to another exemplary embodiment of the present invention includes any one of the power supply devices described above. The power storage device includes the power supply device, and a power supply controller that controls charging and discharging of the power supply device. The power supply controller enables charging of the battery cells by electric power from an outside and performs control to charge the battery cells.

Furthermore, a method of manufacturing a power supply device according to another exemplary embodiment of the present invention is a method of manufacturing a power supply device including: a plurality of battery cells each including an outer covering can in a prismatic shape; a pair of end plates including pressing surfaces that press both side end surfaces of a battery stack in which the plurality of battery cells are stacked; a plurality of fastening members each forming a plate shape extended in a stacking direction of the plurality of battery cells, and disposed on opposing side surfaces of the battery stack to fasten the end plates to each other; a thermal plate for placing the battery stack on an upper surface side and dissipating heat from the battery stack; and a heat transfer sheet interposed between an upper surface of the thermal plate and a lower surface of the battery stack to bring the thermal plate and the battery stack into a thermally coupled state. The method of manufacturing the power supply device includes the steps of: pressing each end surface of the battery stack with each of the end plates in which a lower side of each of the pressing surfaces is disposed at the same height as or above an upper surface of the heat transfer sheet in a state where the heat transfer sheet is placed on the upper surface of the thermal plate, and the battery stack is further placed on the upper surface of the heat transfer sheet; and fastening with the fastening members in a state where the battery stack is pressed. Accordingly, when the battery stack is fastened by the fastening members, the work of compressing both end surfaces of the battery stack with the pressing surfaces of the end plates can be prevented from being obstructed by the heat transfer sheet because the pressing surfaces are disposed above the heat transfer sheet.

Furthermore, in a method of manufacturing a power supply device according to another exemplary embodiment of the present invention, in the pressing step, each of the end plates is floated and held by a jig from the upper surface of the thermal plate by a thickness of the heat transfer sheet. As a result, the pressing surfaces can be floated by the thickness of the heat transfer sheet by means of the jig and disposed on the heat dissipation sheet.

Hereinafter, exemplary embodiments of the present invention will be described with reference to the drawings. However, the exemplary embodiments described below are examples that allow a technical idea of the present invention to be embodied, and the present invention is not limited to the exemplary embodiments described below. Further, in the present specification, members recited in the claims are not limited to the members of the exemplary embodiments. In particular, it is not intended to limit the scope of the present invention to sizes, materials, and shapes of components, relative arrangement of the components, and the like that are described in the exemplary embodiments, unless otherwise specified. The sizes, materials, and shapes of the components and the relative arrangement of the components are mere explanation examples. Note that the sizes, the positional relation, and the like of the members in the drawings may be exaggerated for clarifying the explanation. Furthermore, in the following description, the same names or the same reference marks denote the same members or members of the same type, and detailed description is appropriately omitted. Further, regarding the elements constituting the present invention, a plurality of elements may be formed of the same member, and one member may serve as a plurality of elements. In contrast, the function of one member may be shared by a plurality of members. Additionally, part of contents described in the exemplary embodiment and an example may be applied in other exemplary embodiments and examples.

A power supply device according to an exemplary embodiment is used for various applications such as a power source that is mounted on an electric vehicle such as a hybrid vehicle or an electric automobile and supplies electric power to a traveling motor, a power source that stores generated electric power of natural energy such as photovoltaic power generation or wind power generation, and a power source that stores midnight electric power, and is particularly used as a power source suitable for high-power and high-current applications. In an example given below, an exemplary embodiment in which the technique is applied to a power supply device for driving an electric vehicle is described.

First Exemplary Embodiment

Figure 2:
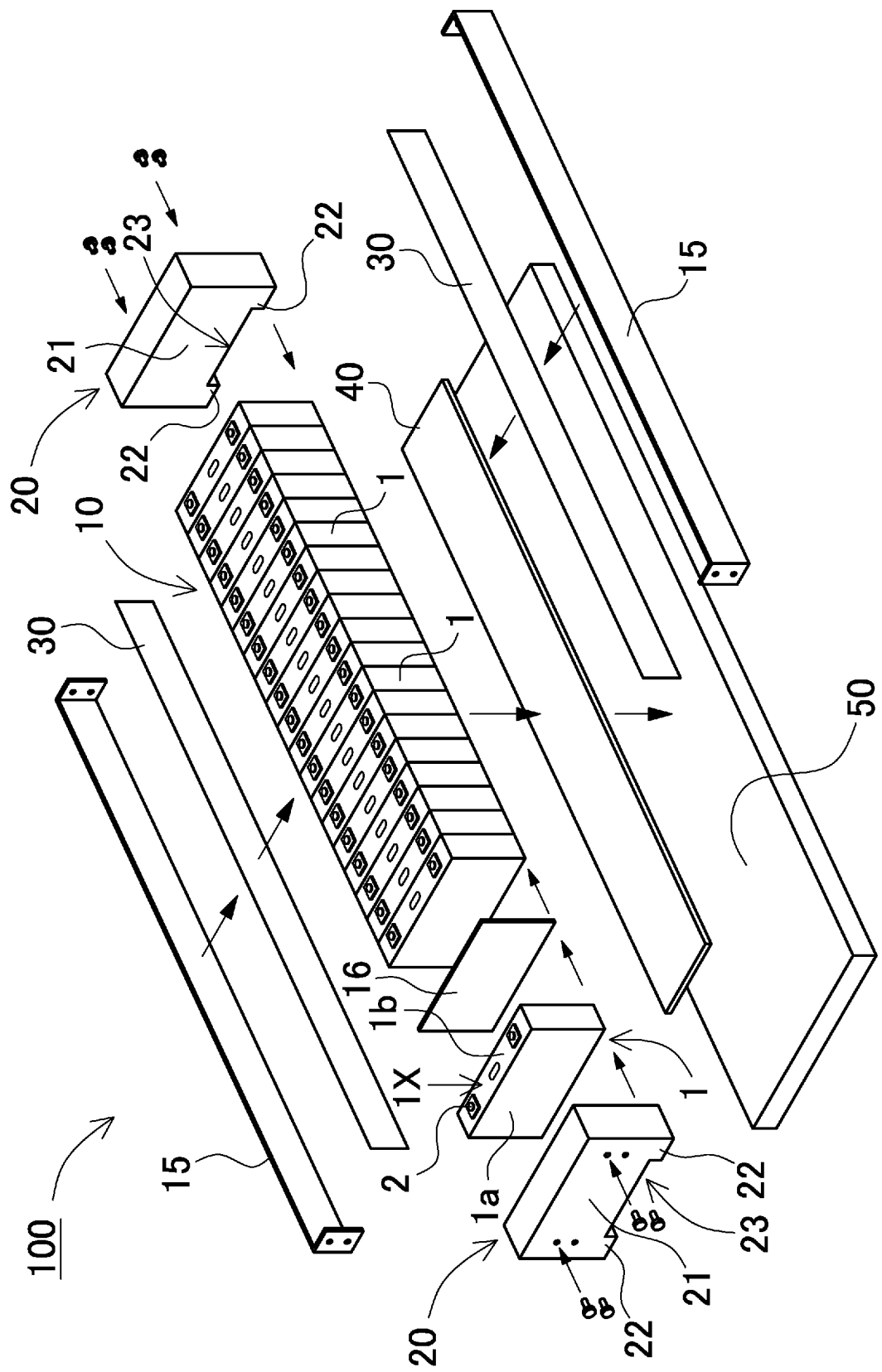
FIG. 2 is an exploded perspective view of the power supply device illustrated in FIG. 1.
Figure 3:
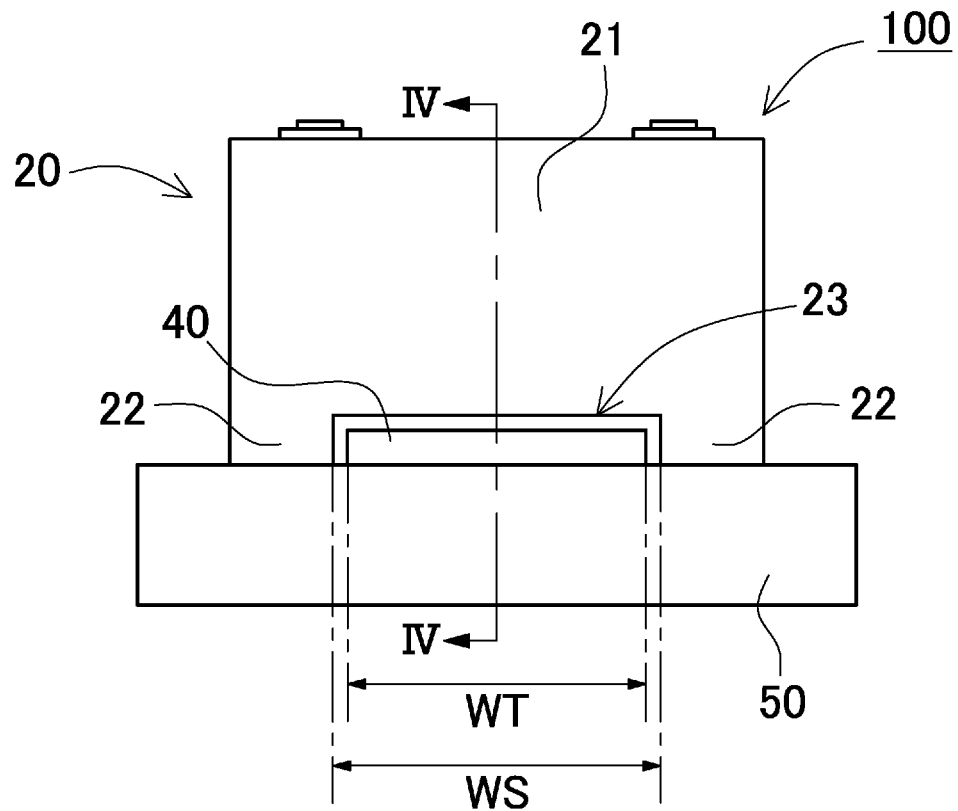
FIG. 3 is a schematic front view of the power supply device of FIG. 1.
Figure 4:
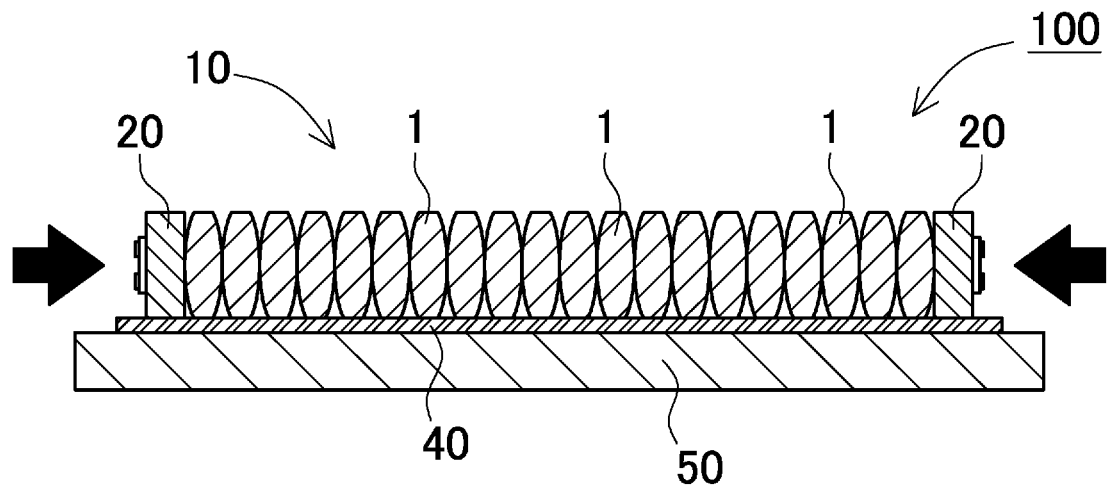
FIG. 4 is a schematic cross-sectional view taken along line IV-IV in FIG. 3 illustrating a state where a battery stack is compressed.

Power supply device 100 according to a first exemplary embodiment of the present invention is illustrated in FIGS. 1 to 4, respectively. In these drawings, FIG. 1 is a perspective view illustrating power supply device 100 according to a first exemplary embodiment, FIG. 2 is an exploded perspective view of power supply device 100 in FIG. 1, FIG. 3 is a schematic front view of power supply device 100 in FIG. 1, and FIG. 4 is a schematic cross-sectional view taken along line Iv-Iv in FIG. 3, illustrating a state in which a battery stack is compressed. Power supply device 100 illustrated in these drawings includes battery stack 10 in which a plurality of battery cells 1 are stacked, a pair of end plates 20 covering both side end surfaces of battery stack 10, a plurality of fastening members 15 for fastening end plates 20 to each other, heat transfer sheet 40 disposed on a lower surface of battery stack 10, and thermal plate 50 disposed on a lower surface of heat transfer sheet 40. Heat dissipation plate 50 cools battery stack 10 mounted on an upper surface of the thermal plate via heat transfer sheet 40. Heat transfer sheet 40 is interposed between the upper surface of thermal plate 50 and the lower surface of battery stack 10 to stabilize a thermally coupled state between thermal plate 50 and battery stack 10. Accordingly, even when battery stack 10 generates heat due to charging and discharging of battery cells 1, heat is conducted to thermal plate 50 through heat transfer sheet 40 to dissipate heat.

On the other hand, the thickness of battery cell 1 changes as an outer covering can expands and contracts due to charging and discharging. Therefore, the overall length of battery stack 10 in which a large number of battery cells 1 are stacked changes. In particular, with the recent demand for higher capacity of power supply devices, the number of stacked battery cells constituting the battery stack tends to increase, and displacement of the battery stack also tends to increase accordingly. As described above, even if the battery cell slightly moves on the upper surface of thermal plate 50 due to expansion or contraction, it is necessary to maintain the thermally coupled state.

At the time of assembling the power supply device, the end plates are fastened to each other by the fastening members in a state where both end surfaces of the battery stack in which a large number of battery cells are stacked are pressed by the end plates. At this time, in order to exert the thermally coupled state between the battery stack and the thermal plate, the heat transfer sheet is disposed on the upper surface of the thermal plate, the battery stack is further placed thereon, and the end plates are fastened by the fastening members in a state where the battery stack is pressed toward the thermal plate. However, as described above, while the overall length of the battery stack changes due to expansion or contraction of the battery cells, the overall length of the heat transfer sheet hardly changes due to such heat. In addition, there are manufacturing tolerances of the thickness of the battery cell and variations in the total length of the heat transfer sheet, and it becomes difficult to match the heat transfer sheet with the total length of the battery stack. For example, when the heat transfer sheet is longer than the battery stack, as illustrated in the cross-sectional view of FIG. 16, when end plate 620 presses the end surface of battery stack 610 placed on the upper surface of thermal plate 650, heat transfer sheet 640 protrudes and interferes at the lower part of battery stack 610. For example, heat transfer sheet 640 is pressed by end plate 620 to be wrinkled, and a thermally coupled state between battery stack 610 and thermal plate 650 is hardly exhibited.

Figure 15:
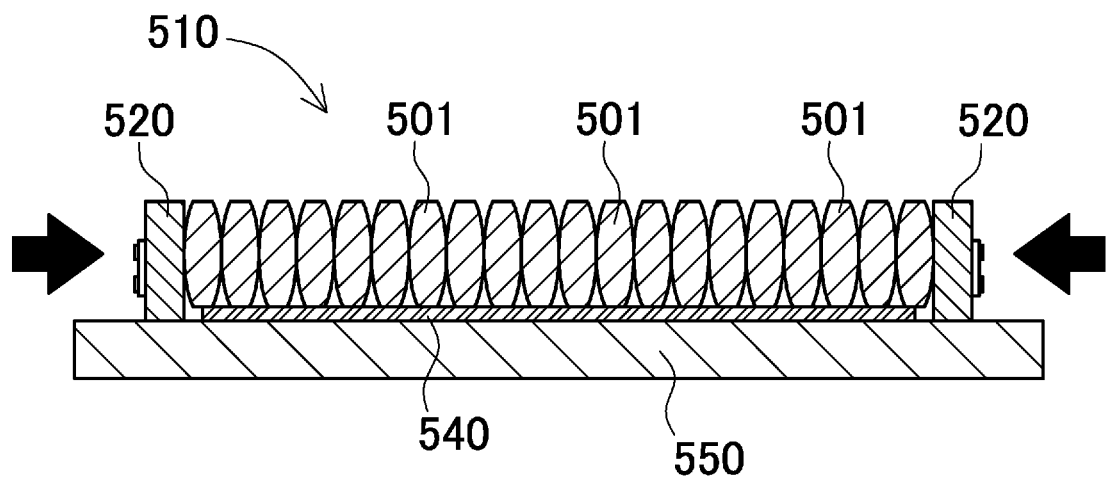
FIG. 15 is a schematic cross-sectional view illustrating a state of compression when a large number of battery cells are fastened.

On the other hand, when the heat transfer sheet is designed to be short in order to avoid such interference, as illustrated in the cross-sectional view of FIG. 15, the interference between end plate 520 and heat transfer sheet 540 is avoided, but it is considered that the lower surface of battery cell 501 located at an end part of battery stack 510 does not come into contact with heat transfer sheet 540, the heat dissipation performance of battery cell 501 is lowered, and some battery cells are likely to deteriorate. However, it is also difficult to accurately design the dimensions of the heat transfer sheet, and it is not realistic due to factors such as a degree of expansion of the battery cells, manufacturing tolerance, and variation of the heat transfer sheet itself.

Therefore, in the power supply device according to the present exemplary embodiment, a part of the lower surface of end plate 20 facing heat transfer sheet 40 is designed to be at the same height as or above the upper surface of heat transfer sheet 40. With such a configuration, at the time of assembling the power supply device, when both end surfaces of the battery stack are compressed by pressing surfaces 21 of end plates 20, the lower surfaces of end plates 20 are located at the same position as or at a position floating from the upper surface of heat transfer sheet 40, so that a situation in which end plates 20 interfere with heat transfer sheet 40 can be avoided, and reliability of a thermally coupled state between the battery stack and thermal plate 50 by heat transfer sheet 40 can be enhanced. Details will be described below.

Battery Stack 10

As illustrated in FIGS. 1 to 2 and the like, battery stack 10 includes the plurality of battery cells 1 each including positive and negative electrode terminals 2, and bus bars (not illustrated) connected to electrode terminals 2 of the plurality of battery cells 1 to connect the plurality of battery cells 1 in parallel and in series. The plurality of battery cells 1 are connected in parallel or in series through these bus bars. Battery cell 1 is a chargeable and dischargeable secondary battery. In power supply device 100, the plurality of battery cells 1 are connected in parallel to form a parallel battery group, and a plurality of the parallel battery groups are connected in series. Accordingly, a large number of battery cells 1 are connected in parallel and in series. In power supply device 100 illustrated in FIGS. 1 and 2, the plurality of battery cells 1 are stacked to form battery stack 10. Further, the pair of end plates 20 is disposed on both end surfaces of battery stack 10. End parts of fastening members 15 are fixed to end plates 20, and battery cells 1 in a stacked state are fixed in a pressed state.

Battery Cell 1

Battery cell 1 is a prismatic battery having a constant cell thickness with an outer shape of a main surface, which is a wide surface, being quadrangular, and has a thickness smaller than the width. Battery cell 1 is a secondary battery that can be charged and discharged, and is a lithium ion secondary battery. However, in the present invention, the battery cell is not specified as the prismatic battery, and is not specified as the lithium ion secondary battery. As the battery cell, all chargeable batteries such as a non-aqueous electrolyte secondary battery other than the lithium ion secondary battery, and a nickel metal hydride battery cell can also be used.

In battery cell 1, an electrode body in which positive and negative electrode plates are stacked is accommodated in outer covering can 1a, filled with an electrolytic solution, and airtightly sealed. Exterior can 1a is molded into a prismatic cylindrical shape that closes at a bottom, and an upper opening part of the outer covering can is airtightly closed by sealing plate 1b of a metal sheet. Exterior can 1a is manufactured by deep-drawing a metal sheet such as aluminum or an aluminum alloy. Sealing plate 1b is made of a metal sheet, such as aluminum or an aluminum alloy, in the same way as outer covering can 1a. Sealing plate 1b is inserted into the opening part of outer covering can 1a, and by irradiating a boundary between the outer periphery of sealing plate 1b and the inner periphery of outer covering can 1a with a laser beam, sealing plate 1b is laser welded and airtightly fixed to outer covering can 1a.

Electrode Terminal 2

In battery cell 1, as illustrated in FIG. 2 and the like, sealing plate 1b as a top surface is used as terminal surface 1X, and positive and negative electrode terminals 2 are fixed to both end parts of terminal surface 1X. A protruding part of electrode terminal 2 has a cylindrical shape. However, the protruding part is not necessarily required to have a cylindrical shape but may have a polygonal columnar shape or an elliptical columnar shape.

The positions at which positive and negative electrode terminals 2 are fixed to sealing plate 1b of battery cell 1 are set to positions where the positive electrode and the negative electrode are arranged in right and left symmetry. As a result, as shown in FIG. 2 and the like, battery cells 1 are laterally inverted and stacked, and electrode terminals 2 of a positive electrode and a negative electrode that are adjacent and close to each other are connected by a bus bar, so that adjacent battery cells 1 can be connected in series. However, the present invention does not specify the number and the state of connection of the battery cells constituting the battery stack. The number and the connection states of the battery cells constituting the battery stack may be modified in various manners, inclusive of other exemplary embodiments to be described later.

The plurality of battery cells 1 are stacked such that a thickness direction of each of battery cells 1 is a stacking direction to form battery stack 10. In battery stack 10, the plurality of battery cells 1 are stacked such that terminal surfaces 1X provided with positive and negative electrode terminals 2, or sealing plates 1b in FIGS. 1 and 2, are flush with each other.

In battery stack 10, insulating spacer 16 may be interposed between stacked battery cells 1 adjacent to each other. Insulating spacer 16 is made of an insulating material such as resin in a thin plate shape or a sheet shape. Insulating spacer 16 has a plate shape having substantially the same size as a facing surface of battery cell 1. Such insulating spacer 16 can be stacked between battery cells 1 adjacent to each other to insulate adjacent battery cells 1 from each other. Note that, as the spacer disposed between battery cells 1 disposed adjacently to each other, it is possible to use a spacer having a shape that allows the formation of a flow path through which a cooling gas flows between the battery cell and the spacer. Furthermore, the surface of the battery cell can also be covered with an insulating material. For example, a shrink tube or a shrink film such as a PET resin may be applied by thermal welding to the surface of the outer covering can excluding the electrode parts of the battery cell. In this case, the insulating spacer may be omitted. Further, in a power supply device in which the plurality of battery cells are connected in multiple parallel and multiple series, insulating spacers are interposed between the battery cells connected in series for insulation, and on the other hand, no voltage difference occurs between the adjacent outer covering cans for the battery cells connected in parallel, so that the insulating spacers between these battery cells can be omitted.

Further, in power supply device 100 illustrated in FIG. 2, end plates 20 are disposed on both end surfaces of battery stack 10. In addition, an end surface spacer may be interposed between end plate 20 and battery stack 10 to insulate the end plate and the battery stack from each other. The end surface spacer can also be made of an insulating material such as resin in a thin plate shape or a sheet shape.

In power supply device 100 according to the first exemplary embodiment, in battery stack 10 in which the plurality of battery cells 1 are stacked on each other, electrode terminals 2 of the plurality of battery cells 1 adjacent to each other are connected by a bus bar, and the plurality of battery cells 1 are connected in parallel and in series. A bus bar holder may be disposed between battery stack 10 and the bus bar. By using the bus bar holder, the plurality of bus bars can be disposed at fixed positions on the upper surface of the battery stack while insulating the plurality of bus bars from each other and insulating the terminal surfaces of the battery cells from the bus bars.

The bus bar is made by cutting and processing a metal sheet to have a predetermined shape. The metal sheet that the bus bar is made of is a sheet of lightweight metal that has low electrical resistance, such as a sheet of aluminum, a sheet of copper, or a sheet of an alloy of these metals. However, for the metal sheet of the bus bar, other metals or their alloys having low electric resistance and being lightweight can also be used.

End Plate 20

As illustrated in FIGS. 1 to 3, end plates 20 are disposed at both ends of battery stack 10 and fastened via a pair of left and right fastening members 15 disposed along both side surfaces of battery stack 10. End plates 20 are disposed at both ends of battery stack 10 in the stacking direction of battery cells 1 and outside the end surface spacers to sandwich battery stack 10 from both ends.

Fastening Member 15

Both ends of fastening member 15 are fixed to end plates 20 disposed on both end surfaces of battery stack 10. End plates 20 are fixed by a plurality of fastening members 15 to fasten battery stack 10 in the stacking direction. As illustrated in FIG. 2 and the like, each of fastening members 15 is made of metal having a predetermined width and a predetermined thickness along a side surface of battery stack 10, and is disposed opposite to both side surfaces of battery stack 10. A metal sheet of such as iron, preferably a steel plate, can be used as fastening member 15. Fastening member 15 made of a metal sheet is bent by press molding or the like to form a predetermined shape.

Fastening member 15 is provided with bent pieces bent in an L shape at both ends in the stacking direction of battery stack 10. The bent pieces are screwed into end plates 20 to fix end plates 20 to each other. A known structure can be appropriately used as the shape of fastening member 15 and the fastening structure with end plates 20. For example, both ends of the fastening member may be formed into a flat plate shape without being bent into an L shape, and may be screwed to the side surface of the end plate. Alternatively, a part where the fastening member faces the side surface of the end plate may be configured to be engaged in a stepped manner as an engagement structure in which the fastening member is further screwed in a state of being engaged with the side surface of the end plate in the engagement structure.

Power supply device 100 in which a large number of battery cells 1 are stacked is configured to bind the plurality of battery cells 1 by connecting end plates 20 disposed at both ends of battery stack 10 including the plurality of battery cells 1 by fastening members 15. By binding the plurality of battery cells 1 via end plates 20 and fastening members 15 having high rigidity, expansion, deformation, relative movement, malfunction due to vibration, and the like of battery cells 1 due to charging and discharging and deterioration can be suppressed.

Insulating sheet 30 is interposed between fastening member 15 and battery stack 10. Insulating sheet 30 is made of a material having an insulating property, such as resin, and insulates metal-made fastening member 15 from battery cell 1.

Note that, when the surface of the battery stack or the battery stack is insulated, for example, when the battery cell is housed in an insulating case, or covered with a heat shrinkable tube or a heat shrinkable film made of resin, or when an insulating paint or coating is applied to the surface of the fastening member, or when the fastening member is made of an insulating material, the insulating sheet can be made unnecessary. In addition, the insulating sheet may also be used as the above-described bus bar holder that holds the bus bar.

Heat Transfer Sheet 40

Heat transfer sheet 40 is made of a material having excellent heat transfer property while having insulating properties. Furthermore, heat transfer sheet 40 has elasticity or flexibility, is pressed and deformed between thermal plate 50 and battery stack 10, and is brought into close contact with an interface between the thermal plate and the battery stack without any gap, thereby forming a thermally coupled state. As such heat transfer sheet 40, a silicone resin or the like can be suitably used. In addition, a filler such as aluminum oxide may be added to increase heat transfer property.

Low Frictional Resistance Region 42

Figure 5:
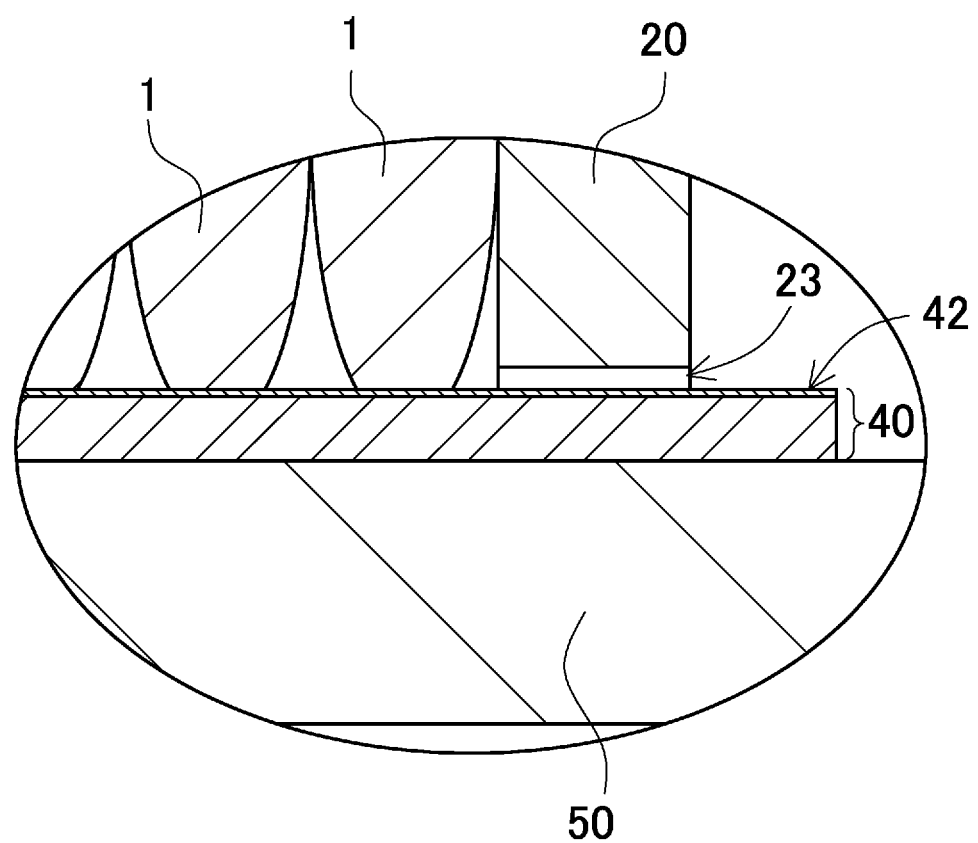
FIG. 5 is an enlarged cross-sectional view illustrating a heat transfer sheet according to a modified example.

On an upper surface of heat transfer sheet 40, it is preferable to provide low frictional resistance region 42 that reduces frictional resistance with battery stack 10. As such low frictional resistance region 42, for example, as illustrated in the cross-sectional view of FIG. 5, a sliding sheet as a separate member may be disposed on the upper surface of heat transfer sheet 40. The sliding sheet is made of a material having frictional resistance smaller than that of heat transfer sheet 40. As a result, when battery stack 10 is displaced by expansion and contraction on the upper surface of heat transfer sheet 40, the upper surface of heat transfer sheet 40 can be slid to avoid generation of wrinkles and maintain the thermally coupled state. As such a sliding sheet, for example, a polyethylene terephthalate (PET) film is preferable, and a biaxially stretched polyethylene terephthalate film is particularly preferable.

In addition, a region for limiting the frictional resistance may be provided on the surface of heat transfer sheet 40. For example, the frictional resistance is reduced by performing surface treatment or processing such as fluororesin coating on the surface of heat transfer sheet 40. Alternatively, grease, oil, or the like may be applied to the surface of heat transfer sheet 40.

Heat Dissipation Plate 50

As thermal plate 50, a metal thermal plate or the like having excellent heat transfer property can be used. Heat dissipation plate 50 may include a cooling mechanism such as a refrigerant circulation path inside. Consequently, battery stack 10 can efficiently be dissipated and cooled by refrigerant cooling, and the thermally coupled state between battery stack 10 and thermal plate 50 can preferably be maintained by heat transfer sheet 40.

Spacer Part 22

End plate 20 has pressing surfaces 21 that press both side end surfaces of battery stack 10. Further, as illustrated in the front view of FIG. 3, the end plate 20 has spacer parts 22 formed on both sides of pressing surface 21 so as to protrude toward a lower surface by the thickness of heat transfer sheet 40. Spacer parts 22 protrude downward from left and right end parts of pressing surface 21 of end plate 20. In addition, interval WS between spacer parts 22 is wider than width WT of heat transfer sheet 40. By providing such spacer part 22, pressing surface 21 can be floated by the thickness of heat transfer sheet 40, and even if heat transfer sheet 40 is longer than the length of battery stack 10, it is possible to avoid a situation in which an end part of heat transfer sheet 40 interferes with end plate 20.

Preferably, pressing surface 21 and spacer part 22 are integrally formed with the end plate 20. In the example of FIG. 3, recessed part 23 is formed on a lower surface of end plate 20 of a metal sheet, and the left and right of recessed part 23 are spacer parts 22 defining recessed part 23. As a result, recessed part 23 is formed on end plate 20 by pressing surface 21 and spacer parts 22.

Furthermore, it is preferable to form a gap between recessed part 23 and heat transfer sheet 40. Accordingly, even when a position of end plate 20 is displaced due to expansion and contraction of battery stack 10, end plate 20 and heat transfer sheet 40 are separated from each other by a gap, whereby a situation in which interference or a load is applied to heat transfer sheet 40 due to the displacement of end plate 20 can be avoided, and the thermally coupled state between thermal plate 50 and battery stack 10 by heat transfer sheet 40 can be maintained.

Figure 17A:
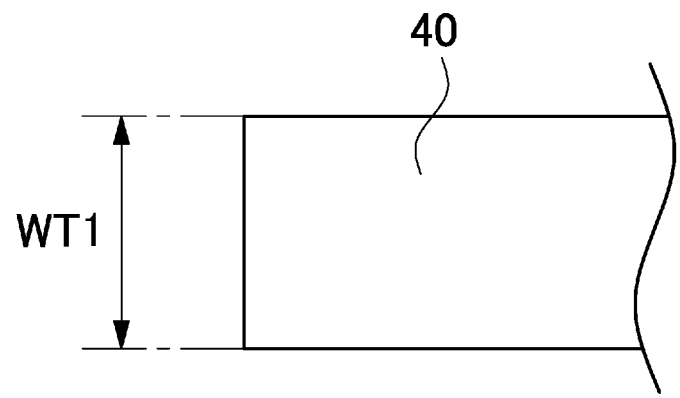
FIGS. 17A, 17B and 17C are plan views illustrating examples of shapes of end surfaces of a heat transfer sheet.
Figure 17B:
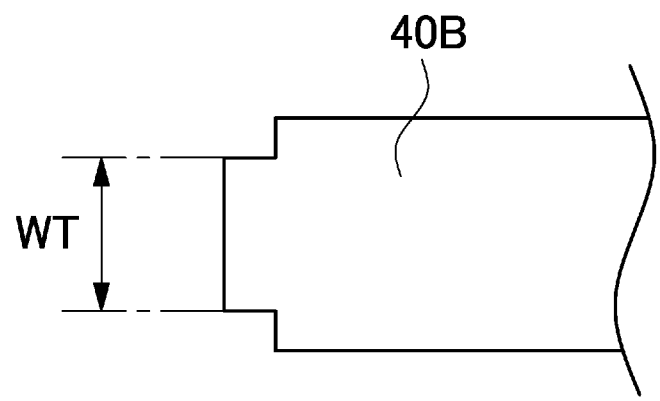
Figure 17C:
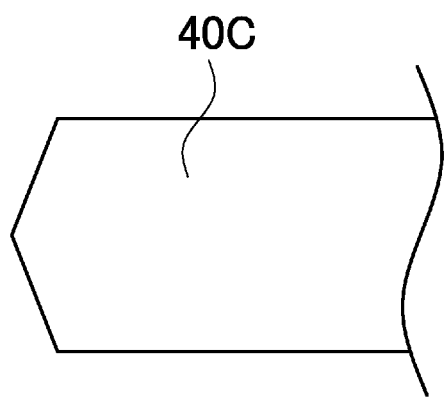

Further, as illustrated in the plan view of FIG. 17A, width WT1 of an intermediate part of heat transfer sheet 40 is preferably about the same as the width of battery cell 1. Consequently, the bottom surface of each battery cell 1 can surely exhibit the thermally coupled state with thermal plate 50. On the other hand, in order to insert an end edge of heat transfer sheet 40 having the same width as the width of battery cell 1 into recessed part 23 of end plate 20, it is necessary to make the width of end plate 20 larger than the width of battery cell 1 by two spacers 22. This leads to an increase in size of battery stack 10 whose end surface is held by end plate 20. In order to avoid this, the shape of the end edge of the heat transfer sheet may be narrowed. For example, in heat transfer sheet 40B according to a modified example illustrated in FIG. 17B, the end edge has a shape protruding in a projecting stripe in the intermediate part, and the width of the projecting stripe part is WT. Accordingly, the end edge of heat transfer sheet 40B can pass through recessed part 23 without increasing the width of end plate 20. Further, as in heat transfer sheet 40C according to a modified example illustrated in FIG. 17C, the end edge part may have a tapered shape. Also in this configuration, the protruding part is narrowed, and the end edge of heat transfer sheet 40C can pass through recessed part 23 without increasing the width of end plate 20.

Note that, in the example of the perspective view of FIG. 1, since heat transfer sheet 40 is illustrated, the state in which heat transfer sheet 40 protrudes from recessed part 23 is exaggerated. However, heat transfer sheet 40 does not necessarily protrude from recessed part 23, and for example, an end edge of heat transfer sheet 40 may stop inside recessed part 23.

Second Exemplary Embodiment

Figure 6:
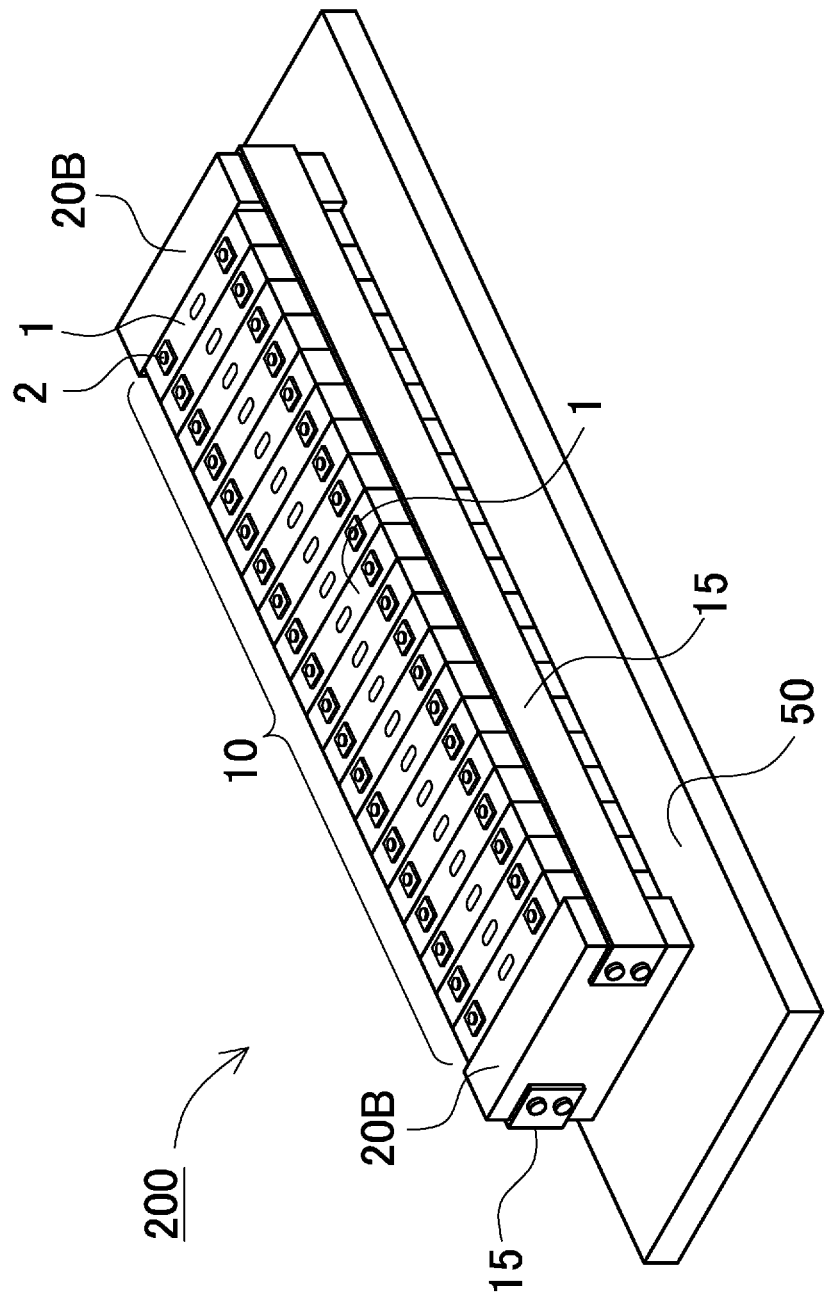
FIG. 6 is a perspective view illustrating a power supply device according to a second exemplary embodiment.
Figure 7:
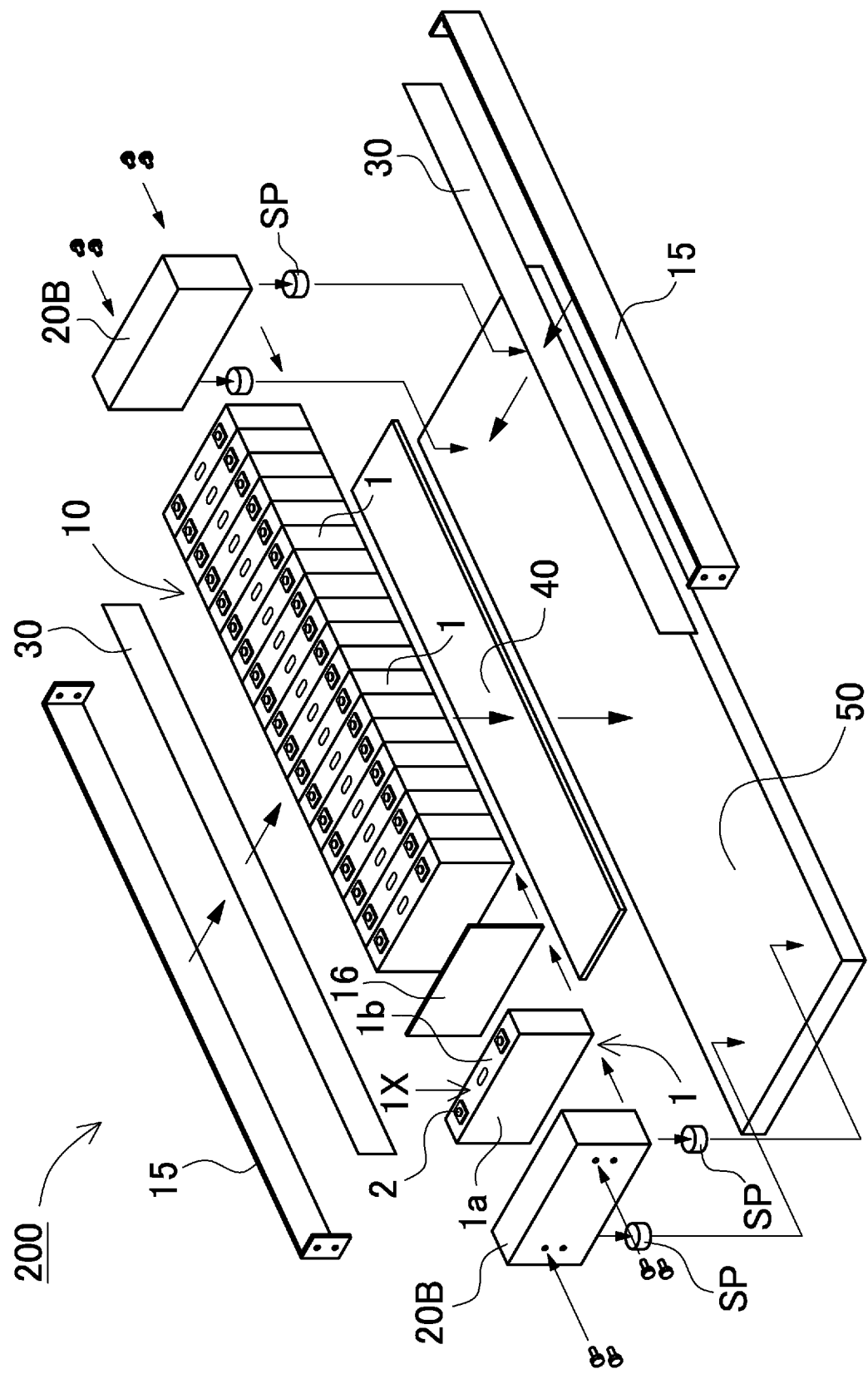
FIG. 7 is an exploded perspective view of the power supply device of FIG. 6.
Figure 8:
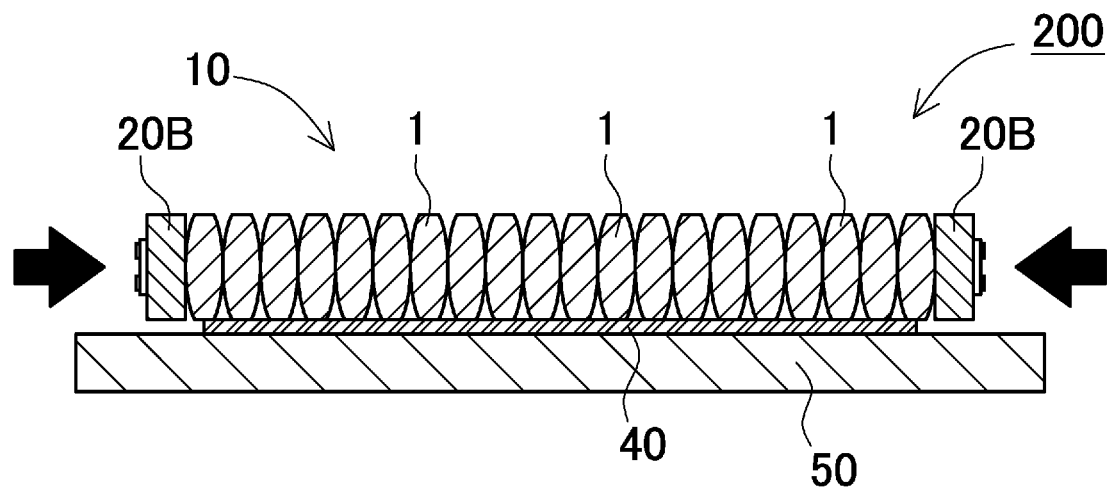
FIG. 8 is a schematic cross-sectional view illustrating a state of compression when a battery stack of FIG. 7 is fastened.

In the above example, the configuration in which pressing surface 21 of end plate 20 is held at a position higher than heat transfer sheet 40 by spacer part 22 has been described. However, the present invention is not limited to this configuration, and other configurations that avoid occurrence of interference between the end plate and the heat transfer sheet due to expansion and contraction of the battery stack can be adopted. For example, the end plate may be physically spaced apart from the upper surface of thermal plate 50. Such an example is illustrated in FIGS. 6 to 8 as power supply device 200 according to a second exemplary embodiment. In these drawings, FIG. 6 is a perspective view illustrating power supply device 200 according to the second exemplary embodiment, FIG. 7 is an exploded perspective view of power supply device 200 in FIG. 6, and FIG. 8 is a vertical cross-sectional view of power supply device 200 in FIG. 6. Power supply device 200 illustrated in these drawings includes battery stack 10, heat transfer sheet 40, and thermal plate 50. Note that same members as those of power supply device 100 according to the first exemplary embodiment described above are denoted by the same reference numerals, and detailed description of these parts will be appropriately omitted.

Figure 16:
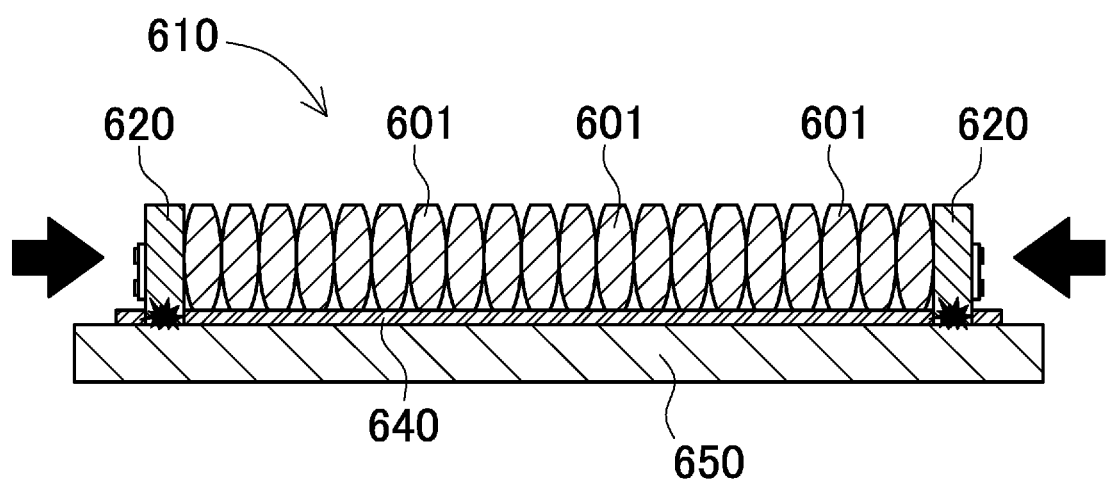
FIG. 16 is a schematic cross-sectional view illustrating a state in which compression is inhibited by a heat transfer sheet when a large number of battery cells are fastened.

In power supply device 200, as illustrated in a schematic vertical sectional view of FIG. 8, a lower surface of end plate 20B is floated from an upper surface of thermal plate 50. Further, the lower surface of end plate 20B is separated from the end surface of heat transfer sheet 40. Also with such a configuration, when battery stack 10 is pressed by end plate 20B at the time of assembling power supply device 200 and fastened by fastening member 15, as illustrated in FIG. 16, a situation in which the end surface of heat transfer sheet 40 interferes with end plate 620 is avoided, and end plate 20B does not hinder the thermally coupled state between thermal plate 50 and battery stack 10 by heat transfer sheet 40. In order to float end plate 20B from the upper surface of thermal plate 50 in this manner, for example, end plate 20B is fixed to be separated from the upper surface of thermal plate 50 at a predetermined interval using a jig or a spacer. In the example of FIG. 7, spacer SP is interposed at the interface between end plate 20B and thermal plate 50. With this configuration, reliability of heat dissipation performance of battery stack 10 can be maintained while avoiding interference with heat transfer sheet 40 while using the end plate having the same shape as the conventional one without deforming the shape of end plate 20B.

As a structure for holding end plate 20B in a state of being floated on the upper surface of thermal plate 50, a known structure can be appropriately used. For example, a jig that holds the end plate separated from thermal plate 50 is used. Alternatively, the upper surface of the end plate is suspended using a top plate or the like. Further, end plate 20B may be held by using a jig until end plate 20B is fixed to fastening member 15 at the time of assembling power supply device 200, and the jig may be removed after the assembling is completed, and end plate 20B may be maintained in the separated attitude by battery stack 10.

Modified Example

Figure 9:
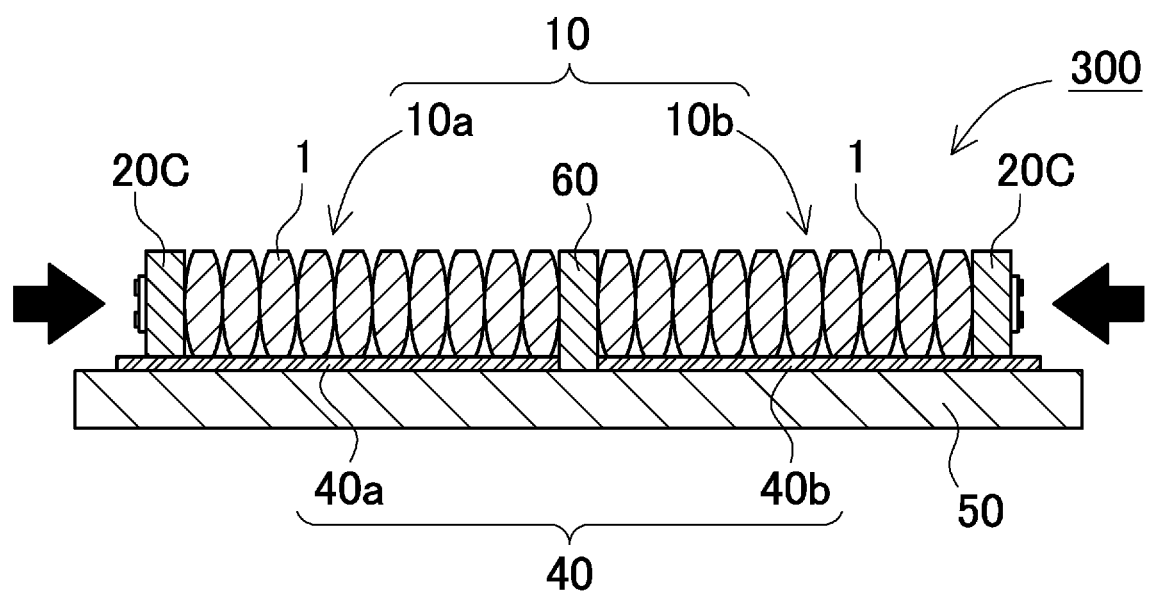
FIG. 9 is a vertical cross-sectional view illustrating a power supply device according to a modified example.

In the above power supply device, the configuration in which the battery stack is pressed only by the end plate has been described. However, in the present invention, the battery stack may be pressed by a member other than the end plates. For example, an intermediate plate may be interposed between the battery stacks, and a part of the battery stack may be pressed against the end plate via the intermediate plate. Such a configuration is illustrated in FIG. 9 as power supply device 300 according to a modified example. Power supply device 300 illustrated in this drawing includes intermediate plate 60 in the middle of battery stack 10.

Intermediate Plate 60

Intermediate plate 60 is interposed in the middle of battery stack 10, and both side surfaces of intermediate plate 60 press a part of battery stack 10 against end plates 20C. In the example of FIG. 9, battery stack 10 is divided into two partial battery stacks 10a, 10b at the center of battery stack 10, and partial battery stacks 10a, 10b divided by intermediate plate 60 are pressed. Intermediate plate 60 and one end plate 20C, and intermediate plate 60 and the other end plate 20C are each fastened by fastening member 15. This structure is similar to a configuration in which, in a configuration in which two battery stacks are arranged in a straight line in the stacking direction, end plates facing each other in the middle are common intermediate plates. Compared with the configuration in which the two battery stacks are arranged, an advantage that the overall length can be shortened by an amount of replacement of the two end plates with one intermediate plate 60 is obtained. Also in such a configuration, similarly, when partial battery stacks 10a, 10b are pressed by end plate 20C and intermediate plate 60, a problem of interference with the heat transfer sheet occurs. Therefore, similarly to the above-described exemplary embodiment, by adopting a configuration in which the lower surfaces of intermediate plate 60 and end plate 20C are disposed at the same height as or higher than the upper surface of heat transfer sheet 40, it is possible to avoid interference with heat transfer sheet 40 and maintain the thermally coupled state between divided partial battery stacks 10a, 10b and thermal plate 50 in a favorable state. In the example of FIG. 9, heat transfer sheet 40 is divided into two partial heat transfer sheets 40a, 40b by intermediate plate 60. Note that, as the shape of intermediate plate 60, a shape similar to that in FIG. 3 or a separation structure similar to that in FIG. 8 can be appropriately adopted.

Figure 10:
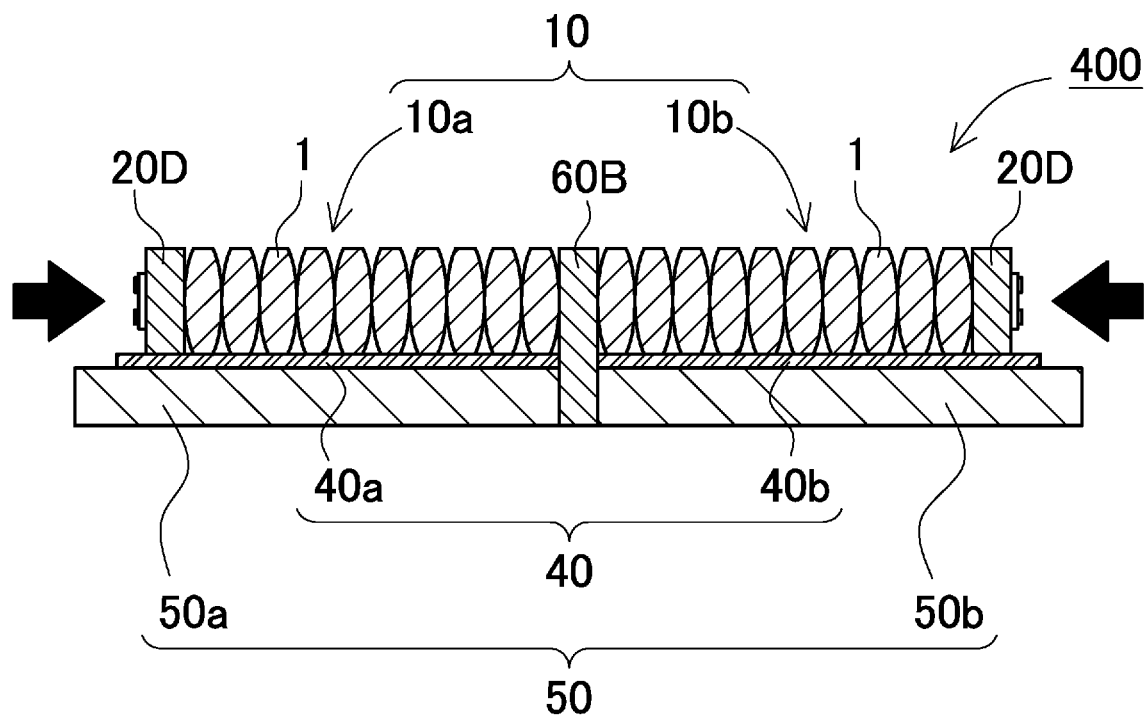
FIG. 10 is a vertical cross-sectional view illustrating a power supply device according to another modified example.

Furthermore, in the example of FIG. 9, divided partial battery stacks 10a, 10b are disposed on the upper surface of common long thermal plate 50. However, the present invention is not limited to this configuration, and the thermal plate may be divided. Such an example is illustrated in a schematic cross-sectional view of FIG. 10 as power supply device 400 according to another modified example. Even when thermal plate 50 is configured to be divided into partial thermal plates 50a, 50b as described above, while partial battery stacks 10a, 10b are similarly pressed by end plate 20D and intermediate plate 60B, the thermal coupling state between partial thermal plates 50a, 50b and partial battery stacks 10a, 10b can be favorably maintained by partial heat transfer sheets 40a, 40b. In the example of FIG. 10, thermal plate 50 is divided into partial thermal plates 50a, 50b at a position of intermediate plate 60B. In particular, in a case where it is difficult to form a long thermal plate such as a case where the number of stacked battery cells is large, or in a case where uniform heat dissipation performance and cooling performance cannot be exhibited by the long thermal plate, it is possible to cope with such a case by dividing the thermal plate. Furthermore, in the example of FIG. 10, battery stack 10 is divided into two by using one intermediate plate 60B. However, the present invention is not limited to this example, and it goes without saying that the battery stack may be divided into three or more by using two or more intermediate plates.

Method of Manufacturing Power Supply Device

Next, a method of manufacturing the power supply device will be described. First, in a state where heat transfer sheet 40 is placed on an upper surface of thermal plate 50, and battery stack 10 is placed on an upper surface of heat transfer sheet 40, each end surface of battery stack 10 is pressed by a pair of end plates 20. At this time, the lower side of pressing surface 21 of end plate 20 is disposed at the same height as or above the upper surface of heat transfer sheet 40. End plates 20 are fastened to each other by fastening member 15 with battery stack 10 pressed in this way. Consequently, when battery stack 10 is fastened by fastening member 15, the work of compressing the both end surfaces of battery stack 10 by pressing surfaces 21 of end plates 20 is prevented from being obstructed by heat transfer sheet 40 because pressing surfaces 21 are disposed on the upper side of heat transfer sheet 40.

In addition, in the pressing step by end plate 20, end plate 20 can be held to float from the upper surface of thermal plate 50 by the jig by the thickness of heat transfer sheet 40. As a result, pressing surface 21 can be floated and disposed on the heat dissipation sheet by the thickness of heat transfer sheet 40 by means of the jig.

Power supply device 100 described above can be used as a power source for a vehicle, which supplies electric power to a motor that causes an electric vehicle to travel. As an electric vehicle on which power supply device 100 is mounted, an electric vehicle such as a hybrid vehicle or a plug-in hybrid vehicle that travels by both an engine and a motor, or an electric automobile that travels only by a motor can be used, and is used as a power source of these vehicles. Note that, in order to obtain power for driving the electric vehicle, an example will be described in which a large number of the above-described power supply devices 100 are connected in series or in parallel, and a large-capacity and high-output power supply device to which a necessary controlling circuit is further added is constructed.

Power Supply Device for Hybrid Vehicle

Figure 11:
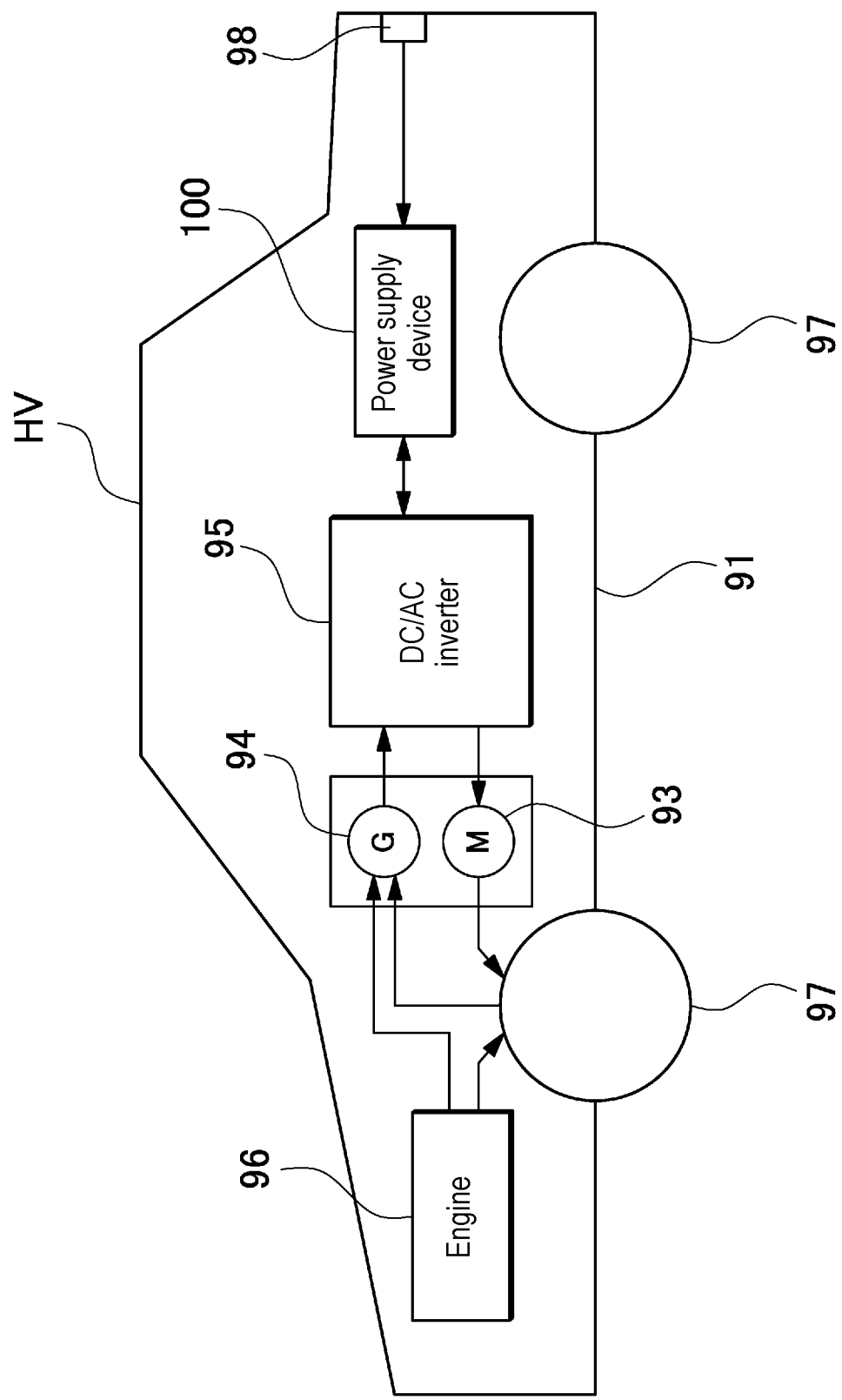
FIG. 11 is a block diagram illustrating an example in which the power supply device is mounted on a hybrid vehicle that travels by an engine and a motor.

FIG. 11 illustrates an example in which power supply device 100 is mounted on a hybrid automobile that travels by both an engine and a motor. Vehicle HV illustrated in this drawing on which power supply device 100 is mounted includes vehicle body 91, engine 96 and traveling motor 93 that cause vehicle body 91 to travel, wheels 97 that are driven by engine 96 and traveling motor 93, power supply device 100 that supplies electric power to motor 93, and power generator 94 that charges batteries of power supply device 100. Power supply device 100 is connected to motor 93 and power generator 94 via DC/AC inverter 95. Vehicle HV travels by both motor 93 and engine 96 while charging or discharging the batteries of power supply device 100. Motor 93 is driven in a region where an engine efficiency is low, for example, during acceleration or low-speed traveling, and causes the vehicle to travel. Motor 93 is driven by electric power supplied from power supply device 100. Power generator 94 is driven by engine 96 or by regenerative braking when the vehicle is braked to charge the batteries of power supply device 100. Note that, as illustrated in FIG. 11, vehicle HV may be provided with charging plug 98 for charging power supply device 100. By connecting this charging plug 98 to an external power source, power supply device 100 can be charged.

Power Supply Device for Electric Automobile

Figure 12:
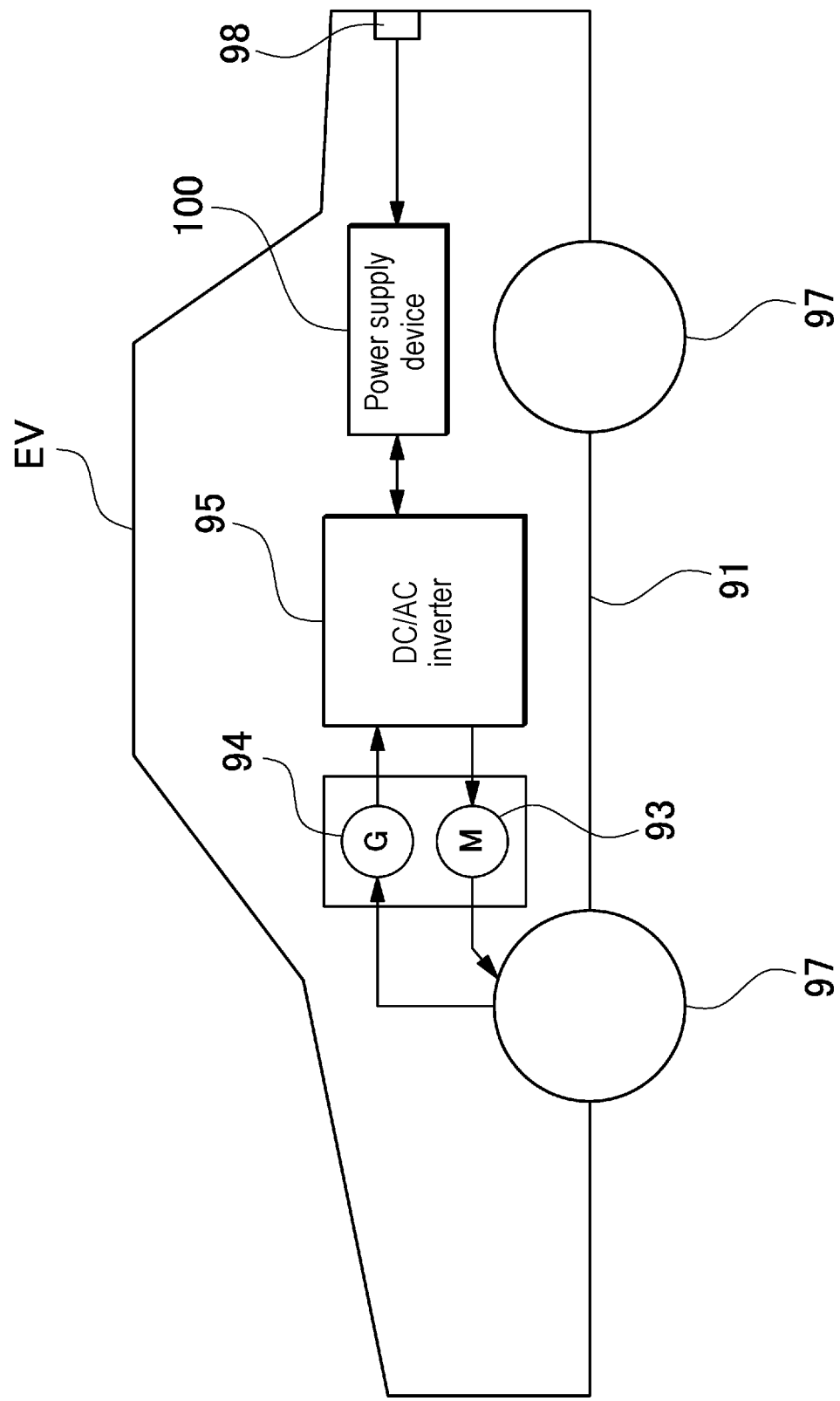
FIG. 12 is a block diagram illustrating an example in which the power supply device is mounted on an electric automobile that travels only by a motor.

FIG. 12 illustrates an example in which power supply device 100 mounted on an electric automobile that travels only by a motor. Vehicle EV illustrated in this drawing on which power supply device 100 is mounted includes vehicle body 91, travelling motor 93 that causes vehicle body 91 to travel, wheels 97 driven by motor 93, power supply device 100 that supplies electric power to motor 93, and power generator 94 that charges batteries of power supply device 100. Power supply device 100 is connected to motor 93 and power generator 94 via DC/AC inverter 95. Motor 93 is driven by electric power supplied from power supply device 100. Power generator 94 is driven by energy at the time of applying regenerative braking to vehicle EV, and charges the batteries of power supply device 100. Furthermore, vehicle EV includes charging plug 98, and power supply device 100 can be charged by connecting charging plug 98 to an external power source.

(Power Supply Device for Power Storage Device)

Figure 13:
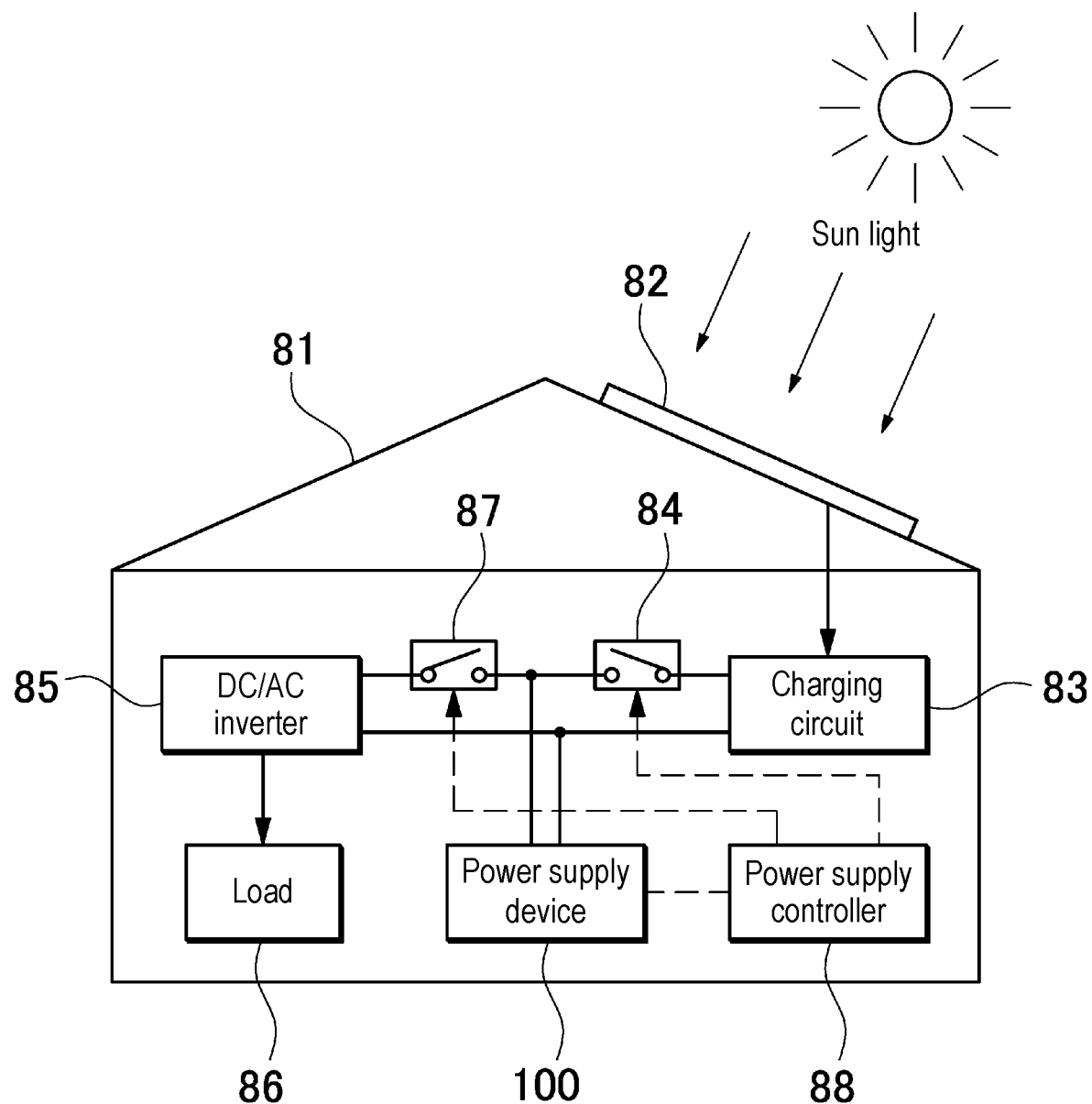
FIG. 13 is a block diagram illustrating an example of application to a power supply device for power storage.
Figure 14:
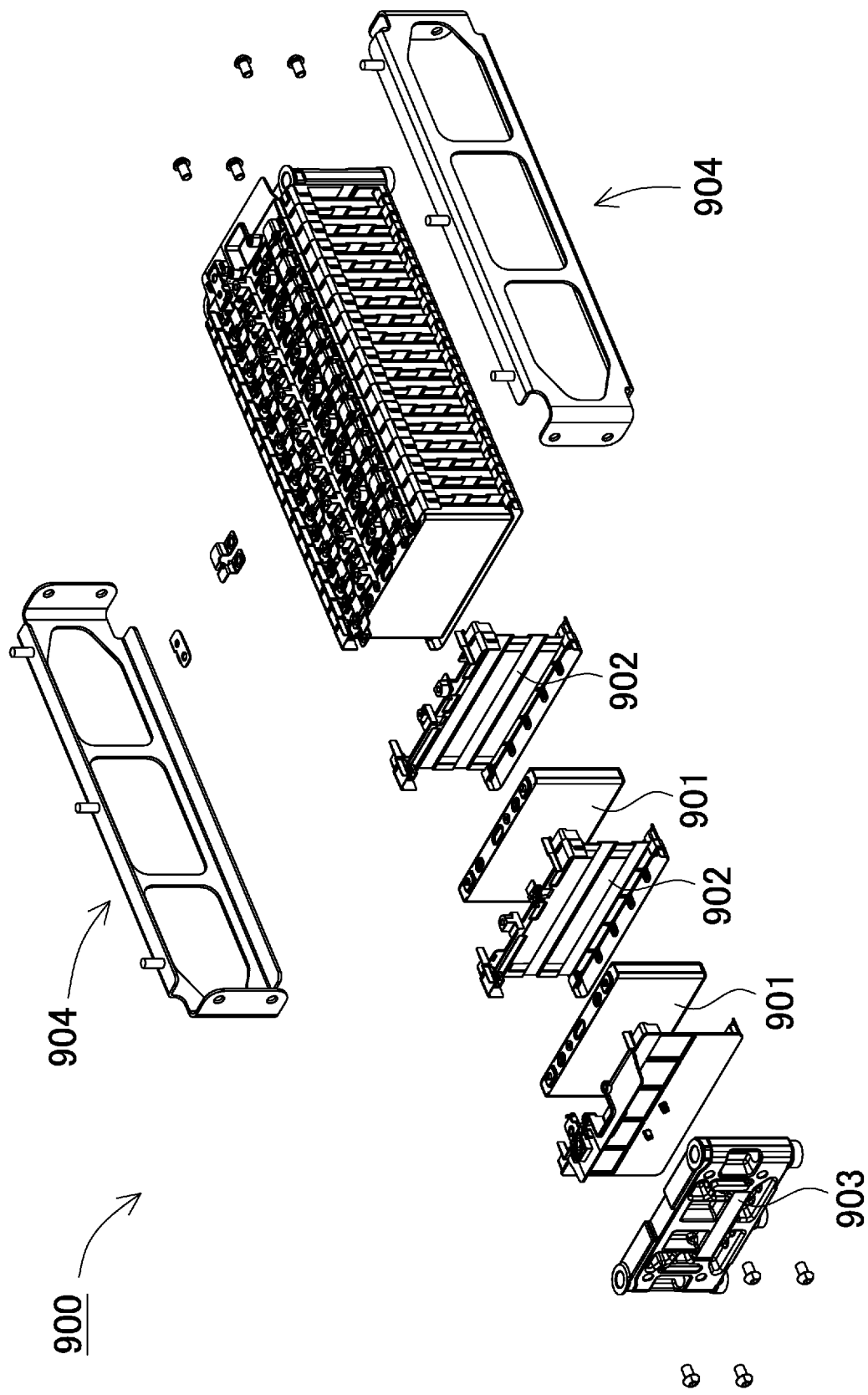
FIG. 14 is an exploded perspective view illustrating a conventional power supply device.

Further, the present invention does not specify an application of the power supply device as a power source of the motor that causes a vehicle to travel. The power supply device according to the exemplary embodiment can also be used as a power source for a power storage device that stores electricity by charging a battery with electric power generated by photovoltaic power generation, wind power generation, or the like. FIG. 13 shows a power storage device that charges and stores the batteries of power supply device 100 with solar battery 82.

The power storage device illustrated in FIG. 13 charges the batteries of power supply device 100 with electric power generated by solar battery 82 disposed on a roof, a rooftop, or the like of building 81 such as a house or a factory. The power storage device charges the batteries of power supply device 100 via charging circuit 83 with solar battery 82 serving as a charging power source, and then supplies electric power to load 86 via DC/AC inverter 85. Thus, the power storage device has a charge mode and a discharge mode. In the power storage device illustrated in the drawing, DC/AC inverter 85 and charging circuit 83 are connected to power supply device 100 via discharging switch 87 and charging switch 84, respectively. Discharging switch 87 and charging switch 84 are turned on and off by power supply controller 88 of the power storage device. In the charge mode, power supply controller 88 turns on charging switch 84, and turns off discharging switch 87 to allow charging from charging circuit 83 to power supply device 100. Furthermore, when charging is completed and the batteries are fully charged or when the batteries are in a state where a capacity equal to or larger than a predetermined value is charged, power supply controller 88 turns off charging switch 84 and turns on discharging switch 87 to switch a mode to the discharge mode, and allows discharging from power supply device 100 to load 86. Further, it is also possible to simultaneously supply power to load 86 and charge power supply device 100 by turning on charge switch 84 and turning on discharging switch 87 as necessary.

Although not illustrated, the power supply device can also be used as a power source of a power storage device that stores electricity by charging a battery using midnight electric power at night. The power supply device that is charged with midnight electric power is charged with the midnight electric power that is surplus electric power generated by a power station, and outputs the electric power during the daytime when an electric power load increases. Accordingly, peak electric power during the daytime can be limited to a small value. Further, the power supply device can also be used as a power source that is charged with both output power of a solar battery and the midnight electric power. This power supply device can efficiently store electricity using both electric power generated by the solar battery and the midnight electric power effectively in consideration of weather and electric power consumption.

The power storage system as described above can be preferably used in applications including a backup power supply device that can be mounted in a rack of a computer server, a backup power supply device for a radio base station for a mobile phone or the like, a power source for power storage used at home or in a factory, a power storage device combined with a solar battery, such as a power source for street lights, and a backup power source for traffic lights and traffic indicators on roads.

INDUSTRIAL APPLICABILITY

The power supply device according to the present invention and a vehicle equipped with the power supply device are suitably used as a large current power source used for a power source of a motor for driving an electric vehicle such as a hybrid vehicle, a fuel cell automobile, an electric automobile, or an electric motorcycle. As an example, a power supply device for a plug-in type hybrid electric automobile that can switch between an EV travelling mode and an HEV travelling mode, a hybrid type electric automobile, an electric automobile, or the like can be mentioned. Furthermore, the power supply device can also be appropriately used for the following applications: a backup power supply device mountable in a rack of a computer server; a backup power supply device used for radio base stations of mobile phones; a power source for power storage used at home or in a factory; a power storage device combined with a solar battery, such as a power source for street lights; and a backup power source for traffic lights.

REFERENCE MARKS IN THE DRAWINGS 100, 200, 300, 400 power supply device
1, 501, 601 battery cell
1X terminal surface
1a outer covering can
1b sealing plate
2 electrode terminal
10, 510, 610 battery stack
10a, 10b partial battery stack
15 fastening member
16 insulating spacer
20, 20B, 20C, 20D, 520, 620 end plate
21 pressing surface
22 spacer part
23 recessed part
30 insulating sheet
40, 40B, 40C, 540, 640 heat transfer sheet
40a, 40b partial heat transfer sheet
42 low frictional resistance region
50, 550, 650 thermal plate
50a, 50b partial thermal plate
60, 60B intermediate plate
81 building
82 solar battery
83 charging circuit
84 charging switch
85 DC/AC inverter
86 load
87 discharging switch
88 power supply controller
91 vehicle body
93 motor
94 power generator 95 DC/AC inverter
96 engine
97 wheel
98 charging plug
900 power supply device
901 battery cell
902 spacer
903 end plate
904 bind bar
WS interval between spacer parts
WT width of heat transfer sheet
SP spacer
HV, EV vehicle

The invention claimed is:

1. A power supply device comprising:
a plurality of battery cells each including an outer covering can in a prismatic shape;
a pair of end plates each including a pressing surface that presses a corresponding one of both side end surfaces of a battery stack including the plurality of battery cells stacked;
a plurality of fastening members each including a plate shape extended in a stacking direction of the plurality of battery cells, the plurality of fastening members each being disposed on a corresponding one of opposing side surfaces of the battery stack to fasten the end plates to each other;
a thermal plate for placing the battery stack close to an upper surface of the thermal plate and dissipating heat from the battery stack; and
a heat transfer sheet interposed between an upper surface of the thermal plate and a lower surface of the battery stack to bring the thermal plate and the battery stack into a thermally coupled state,
wherein each of the end plates includes a part of a lower surface facing the heat transfer sheet, the part being disposed at the same height as or above an upper surface of the heat transfer sheet, and
the end plates each includes each of spacer parts protruding by a thickness of the heat transfer sheet on a corresponding one of both sides of the pressing surface.

2. The power supply device according to claim 1, further comprising
an intermediate plate that is located in a middle of the battery stack and presses the battery stack from the middle on both side surfaces of the intermediate plate.

3. The power supply device according to claim 2, wherein the thermal plate is divided at a position of the intermediate plate.

4. The power supply device according to claim 1, wherein the heat transfer sheet includes a low frictional resistance region that reduces frictional resistance with the battery stack on an upper surface of the heat transfer sheet.

5. The power supply device according to claim 4, wherein the low frictional resistance region is a sliding sheet interposed between the heat transfer sheet and the battery stack, and frictional resistance of the sliding sheet is lower than frictional resistance of the heat transfer sheet.

6. A vehicle comprising:
the power supply device according to claim 1;
a motor for travelling that is supplied with electric power from the power supply device;
a vehicle body mounted with the power supply device and the motor; and
wheels that are driven by the motor to cause the vehicle body to travel.

7. A power storage device comprising the power supply device according claim 1;
the power supply device; a power supply controller that controls charging and discharging of the power supply device, and the power supply controller enables charging of the battery cells by electric power from an outside and performs control to charge the battery cells.

8. A power supply device comprising:
a plurality of battery cells each including an outer covering can in a prismatic shape;
a pair of end plates each including a pressing surface that presses a corresponding one of both side end surfaces of a battery stack including the plurality of battery cells stacked;
a plurality of fastening members each including a plate shape extended in a stacking direction of the plurality of battery cells, the plurality of fastening members each being disposed on a corresponding one of opposing side surfaces of the battery stack to fasten the end plates to each other;
a thermal plate for placing the battery stack close to an upper surface of the thermal plate and dissipating heat from the battery stack; and
a heat transfer sheet interposed between an upper surface of the thermal plate and a lower surface of the battery stack to bring the thermal plate and the battery stack into a thermally coupled state,
wherein each of the end plates includes a part of a lower surface facing the heat transfer sheet, the part being disposed at the same height as or above an upper surface of the heat transfer sheet, and
the end plates each includes a lower surface separated from an end surface of the heat transfer sheet.

9. The power supply device according to claim 8, further comprising
an intermediate plate that is located in a middle of the battery stack and presses the battery stack from the middle on both side surfaces of the intermediate plate.

10. The power supply device according to claim 9, wherein
the thermal plate is divided at a position of the intermediate plate.

11. The power supply device according to claim 8, wherein
the heat transfer sheet includes a low frictional resistance region that reduces frictional resistance with the battery stack on an upper surface of the heat transfer sheet.

12. The power supply device according to claim 11, wherein
the low frictional resistance region is a sliding sheet interposed between the heat transfer sheet and the battery stack, and frictional resistance of the sliding sheet is lower than frictional resistance of the heat transfer sheet.

13. A vehicle comprising:
the power supply device according to claim 8;
a motor for travelling that is supplied with electric power from the power supply device;
a vehicle body mounted with the power supply device and the motor; and
wheels that are driven by the motor to cause the vehicle body to travel.

14. A power storage device comprising the power supply device according claim 8;
the power supply device; a power supply controller that controls charging and discharging of the power supply device, and the power supply controller enables charging of the battery cells by electric power from an outside and performs control to charge the battery cells.

15. A power supply device comprising:
a plurality of battery cells each including an outer covering can in a prismatic shape;
a pair of end plates each including a pressing surface that presses a corresponding one of both side end surfaces of a battery stack including the plurality of battery cells stacked;
a plurality of fastening members each including a plate shape extended in a stacking direction of the plurality of battery cells, the plurality of fastening members each being disposed on a corresponding one of opposing side surfaces of the battery stack to fasten the end plates to each other;
a thermal plate for placing the battery stack close to an upper surface of the thermal plate and dissipating heat from the battery stack; and
a heat transfer sheet interposed between an upper surface of the thermal plate and a lower surface of the battery stack to bring the thermal plate and the battery stack into a thermally coupled state,
wherein the end plates each includes:
each of spacer parts protruding on a corresponding one of both sides of the pressing surface; and
a recessed part defined by the pressing surface and the spacer parts on a lower surface of each of the end plates, and
an uppermost surface of the recessed part is positioned above the lower surface of the battery stack.

16. The power supply device according to claim 15, further comprising
an intermediate plate that is located in a middle of the battery stack and presses the battery stack from the middle on both side surfaces of the intermediate plate.

17. The power supply device according to claim 16, wherein
the thermal plate is divided at a position of the intermediate plate.

18. The power supply device according to claim 15, wherein
the heat transfer sheet includes a low frictional resistance region that reduces frictional resistance with the battery stack on an upper surface of the heat transfer sheet.

19. The power supply device according to claim 18, wherein
the low frictional resistance region is a sliding sheet interposed between the heat transfer sheet and the battery stack, and frictional resistance of the sliding sheet is lower than frictional resistance of the heat transfer sheet.

20. A vehicle comprising:
the power supply device according to claim 15;
a motor for travelling that is supplied with electric power from the power supply device;
a vehicle body mounted with the power supply device and the motor; and
wheels that are driven by the motor to cause the vehicle body to travel.

21. A power storage device comprising the power supply device according claim 15;
the power supply device; a power supply controller that controls charging and discharging of the power supply device, and the power supply controller enables charging of the battery cells by electric power from an outside and performs control to charge the battery cells.

* * * * *